Oct. 2, 1934. A. C. RECKER 1,975,477
CHECK VALVE
Filed July 30, 1932
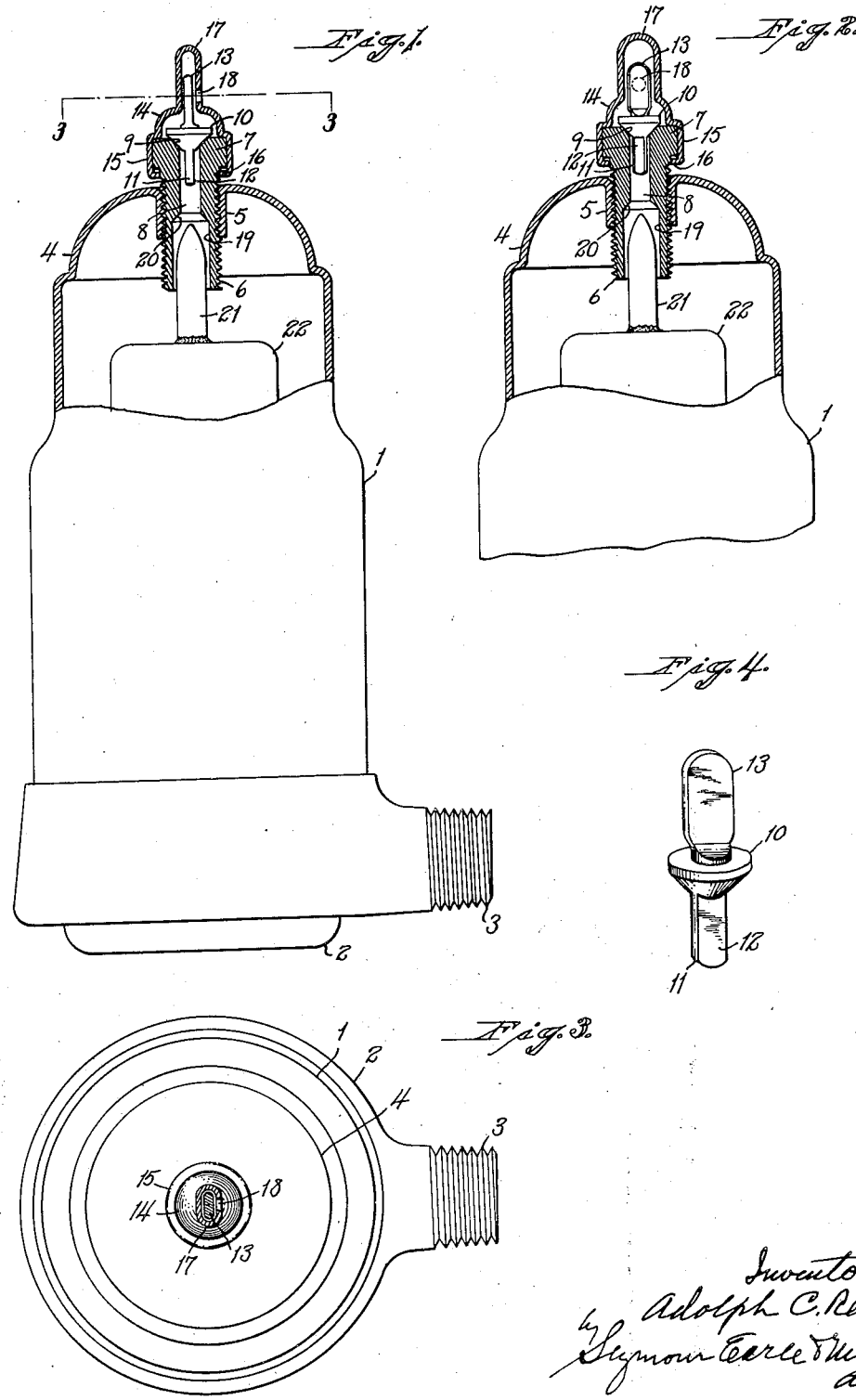

Patented Oct. 2, 1934

1,975,477

UNITED STATES PATENT OFFICE 1,975,477

CHECK VALVE

Adolph C. Recker, Oakville, Conn., assignor to The Chase Companies, Incorporated, Waterbury, Conn., a corporation Application July 30, 1932, Serial No. 626,309

4 Claims. (Cl. 137—122)

This invention relates to check valves, and particularly to check valves for use in connection with radiator air or relief valves of what is known as the "three-element" type.

In such air or relief valves there is a fluid-filled float member mounted for vertical movement within a closed casing adapted to be connected with the radiator. This float member carries a valve needle which has a seat in a bore controlled by a check valve and adapted for communication with the atmosphere. Thus, when there is air in the radiator the float member will unseat its valve needle and the air will escape past the check valve, but when the air has thus escaped and a vacuum becomes operative within the casing the valve needle of the float unseats and the check valve immediately seats to prevent entrance of air into the casing.

It has been found that sometimes, particularly after an extended period of disuse, as after the passing of summer, the check valve sticks to its seat, which results in failure of the air or relief valve to function.

The object of the present invention is to provide a check valve which will avoid this serious objection and which embodies refinements of structural detail that make it superior to any valve of similar type now known.

The invention consists in a check valve, primarily adapted for use in connection with air or relief valves for radiators, which comprises a body having a bore and a seat, a valve element for cooperation with such seat and axially movable toward and away from same, a cap so applied to the body as to be substantially fixed axially thereof but rotatable thereon, and a connection between the valve element and cap, including complemental cooperative elements on both, whereby when the valve element sticks, as mentioned, it may be freed by rotating it through the medium of its connection with the cap, all as will be explained more fully hereinafter and finally claimed.

In the accompanying drawing illustrating the invention, in the several figures of which like parts are similarly designated, Fig. 1 is a partial axial section and side elevation of a radiator air or relief valve embodying the check valve of the invention;

Fig. 2 is a fragmentary sectional elevation similar to Fig. 1 but taken at right angles thereto;

Fig. 3 is a section taken on the line 3—3 of Fig. 1; and

Fig. 4 is a perspective view of the valve element of the check valve, upon a larger scale.

The casing 1 of the air or relief valve, which is preferably made of sheet metal, has a bottom section 2 provided with a screwthreaded nipple 3 by means of which the device may be connected with a radiator, as is customary.

The domed or otherwise appropriately shaped top 4 of the casing 1 is provided with an interiorly screwthreaded sleeve 5 into which is adjustably screwed the body 6 of the check valve of the invention. This body 6 has an enlarged head 7 and an axial bore 8, the upper end of which terminates in a valve seat 9 upon which the valve element 10 of the check valve seats.

The valve element 10 has a stem 11 of such diameter as to provide an easy sliding fit in the bore 8 so that it is guided axially in its movement relatively to its seat 9, and this stem is flattened, as indicated at 12, to prevent obstruction of the bore 8. The top of the valve element 10 is provided with an axial extension 13 flattened or of other appropriate non-cylindrical form to furnish a medium by which the valve may be rotated relatively to its seat in a manner presently to be described.

The valve element 10 is assembled upon the body 6 by, and enclosed within a finish cap 14 having an appropriately shaped flange 15 for rotative but substantially axially fixed connection with the head 7 of the body 6, the edge of the flange being closed in under the head, as indicated at 16, to provide this connection. The top portion of the cap 14 is extended to provide a housing portion 17 to receive the extension 13 of the valve member 10 and so closely embraces this extension 13, as best illustrated in Figs. 1 and 3, that when the cap is rotated the valve element 10 will be rotated with it and relatively to its seat. An appropriate opening 18 is provided in the cap for affording communication between the interior of the casing 1 and atmosphere.

The lower portion of the body 6, which extends within the casing 1, has a counterbore 19 terminating in a seat 20 for the valve needle 21 of the customary float 22.

It is to be noted that although the body 6 may be adjusted axially of the casing 1, by means of its screwthreaded connection therewith, so that the seat 20 may be appropriately positioned with respect to the valve needle 21, it cannot be turned by rotation of the cap 14. Hence, when the seat 20 and valve needle 21 have been properly relatively adjusted, this adjustment is not apt to be disturbed and the functioning of the valve upset by inexperienced persons.

It is known that radiator air or relief valves have been provided with check valves, the valve elements of which may be rotated relatively to their seats by rotation of an enclosing cap, but in all such valves now known the means of connection between the valve elements and caps is such that proper assembly and functioning of the parts are not assured. Valves made in accordance with the present invention, however, have their cooperating parts so constructed that their proper assembly and functioning are certain.

Various changes and modifications are considered to be within the spirit of the invention and the scope of the claims following.

I claim:

1. In a check valve for relief valves for radiators and the like, a valve body having a central, annular, outwardly-flared valve seat, a valve element cooperating with said seat and movable axially relatively thereto, a cap connected with said valve body and rotatable thereon, and means including a non-cylindrical axial extension on said valve element and a complemental member on said cap for coupling said valve element and cap, whereby said valve element is guided to move axially and may be rotated by rotation of said cap, the maximum diameter of said non-cylindrical axial extension being greatly less than the maximum diameter of said body.

2. In a check valve for relief valves for radiators and the like, a valve body having a head and an axial bore, said head being provided with a valve seat at said bore, a valve element cooperating with said seat and being provided with an axial stem movable in said axial bore for guiding said valve element axially of said bore, and a cap closed upon said head and thereby axially fixed but rotatable relatively to said valve body, and means including a non-cylindrical axial extension on said valve element extending oppositely to said axial stem, and a complemental non-cylindrical housing portion on said cap for coupling said valve element and cap, whereby said valve element is guided to move axially and may be rotated relatively to its seat by rotation of said cap, the maximum diameter of said non-cylindrical axial extension being greatly less than the diameter of said head.

3. In a relief valve for radiators and the like, a casing, a float element enclosed within said casing and provided with a valve needle, a check valve having a body externally threadedly engaged in said casing and being provided with an axial bore communicating with the interior of said casing and with the atmosphere, a valve element seating at one end of said bore, said bore providing adjacent to its other end a seat for said valve needle, a cap rotatable on said body, and means including a non-cylindrical axial extension on said valve element and a complemental non-cylindrical housing portion on said cap for coupling said valve element and cap so that said valve element may be rotated by rotation of said cap, whereby if said valve element should stick upon its seat it may be rotated to free it and vent said casing to atmosphere 4. In a relief valve for radiators and the like, a casing, a float element enclosed within said casing and provided with a valve needle, a check valve having a body provided with a head and an axial bore, and an externally screw-threaded portion immediately adjacent said head and screw-threadedly engaged in said casing, a valve element seating at one end of said bore and having a non-cylindrical axial extension, said body being counterbored to provide a guide and seat for said valve needle adjacent to the other end of said bore, a cap enclosing and rotatable on said head and being provided with a non-cylindrical housing portion, said axial extension and said housing portion providing complemental means forming a coupling between said valve element and cap, whereby said valve element may be rotated upon its seat by rotation of said cap.

ADOLPH C. RECKER.